United States Patent
Jang

(10) Patent No.: US 9,240,703 B2
(45) Date of Patent: Jan. 19, 2016

(54) POWER SUPPLY SYSTEM FOR ELECTRIC VEHICLE AND CONTROL METHOD THEREOF

(71) Applicant: LSIS CO., LTD., Anyang-si, Gyeonggi-do (KR)

(72) Inventor: Sung Jin Jang, Seoul (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 459 days.

(21) Appl. No.: 13/679,933

(22) Filed: Nov. 16, 2012

(65) Prior Publication Data
US 2013/0134941 A1    May 30, 2013

(30) Foreign Application Priority Data
Nov. 25, 2011 (KR) .................... 10-2011-0124317

(51) Int. Cl.
H02J 7/04 (2006.01)
B60L 11/18 (2006.01)

(52) U.S. Cl.
CPC ............ *H02J 7/04* (2013.01); *B60L 11/1812* (2013.01); *B60L 11/1816* (2013.01); *B60L 11/1868* (2013.01); *B60L 2210/12* (2013.01); *B60L 2210/30* (2013.01); *B60L 2240/547* (2013.01); *Y02T 10/7005* (2013.01); *Y02T 10/7066* (2013.01); *Y02T 10/7233* (2013.01); *Y02T 10/7241* (2013.01); *Y02T 90/127* (2013.01); *Y02T 90/14* (2013.01)

(58) Field of Classification Search
CPC ..................... Y02T 10/7066; H01M 10/441
USPC .................................................. 320/116
See application file for complete search history.

(56) References Cited

U.S. PATENT DOCUMENTS

| | | | |
|---|---|---|---|
| 2007/0080662 A1* | 4/2007 | Wu | 320/110 |
| 2009/0255493 A1* | 10/2009 | Ichimoto | 123/90.11 |
| 2010/0156355 A1* | 6/2010 | Bauerle et al. | 320/145 |
| 2011/0043165 A1* | 2/2011 | Kinser et al. | 320/109 |
| 2011/0046828 A1* | 2/2011 | Chander et al. | 701/22 |

(Continued)

FOREIGN PATENT DOCUMENTS

| | | |
|---|---|---|
| EP | 2228882 | 9/2010 |
| JP | 2010-110054 | 5/2010 |
| JP | 2010193670 | 9/2010 |

(Continued)

OTHER PUBLICATIONS

Japan Patent Office Application Serial No. 2012-243293, Office Action dated Aug. 6, 2013, 3 pages.

(Continued)

*Primary Examiner* — Drew A Dunn
*Assistant Examiner* — Jerry D Robbins
(74) *Attorney, Agent, or Firm* — Lee, Hong, Degerman, Kang & Waimey

(57) ABSTRACT

A power supply system for EV and a control method thereof are provided, the system including a high voltage battery formed with a plurality of battery cells and generating a power driving source to a motor of the EV, and a low voltage battery generating a power driving source for electrical load, and an OBC (On-Board-Charger) selectively charging a high voltage battery or a low voltage battery using an externally-supplied AC power source based on an output voltage level of the low voltage battery.

7 Claims, 3 Drawing Sheets

(56) References Cited

U.S. PATENT DOCUMENTS

| | | | |
|---|---|---|---|
| 2011/0181236 A1* | 7/2011 | Yang et al. | 320/107 |
| 2011/0273136 A1* | 11/2011 | Yoshimoto | 320/103 |

FOREIGN PATENT DOCUMENTS

| | | |
|---|---|---|
| JP | 2010213499 | 9/2010 |
| JP | 2010213503 | 9/2010 |
| JP | 2011-055682 | 3/2011 |
| JP | 2011072069 | 4/2011 |
| JP | 2011-223834 | 11/2011 |

OTHER PUBLICATIONS

Korean Intellectual Property Office Application Serial No. 10-2011-0124317 Office Action dated Oct. 19, 2012, 4 pages.

The State Intellectual Property Office of the People's Republic of China Application Serial No. 201210488985.8, Office Action dated Jun. 4, 2014, 6 pages.

Japan Patent Office Application Serial No. 2012-243293, Office Action dated Jan. 13, 2015, 4 pages.

Japan Patent Office Application Serial No. 2012-243293, Office Action dated Mar. 4, 2014, 3 pages.

Japan Patent Office Application Serial No. 2012-243293, Office Action dated Jul. 28, 2015, 3 pages.

* cited by examiner

POWER SUPPLY SYSTEM FOR ELECTRIC VEHICLE AND CONTROL METHOD THEREOF

CROSS-REFERENCE TO RELATED APPLICATIONS

Pursuant to 35 U.S.C. §119 (a), this application claims the benefit of earlier filing date and right of priority to Korean Patent Application No. 10-2011-0124317, filed on Nov. 25, 2011, the contents of which are hereby incorporated by reference in their entirety.

BACKGROUND OF THE DISCLOSURE

1. Field of the Disclosure

The present disclosure relates to a power supply system for electric vehicle and control method thereof, and more particularly to a power supply system for electric vehicle configured to selectively charge a high voltage battery or a low voltage battery using an external AC power source, and a control method of a power supply system for electric vehicle.

2. Discussion of the Related Art

The information disclosed in this Discussion of the Related Art section is only for enhancement of understanding of the general background of the present disclosure and should not be taken as an acknowledgement or any form of suggestion that this information forms the prior art already known to a person skilled in the art.

In recent years, with the aim for reducing $CO_2$ discharge in an attempt to prevent global warming and air pollution, hybrid electric vehicles (HEVs) that are provided with a secondary battery and that use both an engine and a motor as a power source, have become increasingly popular, and electric vehicles (EVs) that are provided with a secondary battery and that emit no exhaust gas are also starting to attract attention, where an electric motor is driven by electricity to operate the EV, and the battery supplies electricity to the electric motor.

EVs generally refer to those which utilize electricity for power to a large extent, and typical EVs include an HEV (Hybrid Electric Vehicle), a PHEV (Plug-in Hybrid Electric Vehicle), and an EV (Electric Vehicle).

Generally, a power system of an EV includes a main battery (high voltage battery) supplying a driving power to a driving motor, a BMS (Battery Management System), a sub-battery (low voltage battery) providing a driving power to other vehicular electronic equipment and a host of electric devices.

An inverter may act as an intermediary between battery and electric motor. That is, an inverter converts a high DC (direct current) voltage generated by the main battery (high voltage battery) to an AC (alternating current) signal to control a motor. A low voltage DC-DC Converter (LDC) converts electric power of a high voltage battery into a direct current. That is, the LDC switches a direct current to an alternating current, boosts or drops the alternating current using coil, transformer, capacitance, etc., rectifies the resulting alternating current to a direct current and supplies electricity suitable for voltages used in respective electrical loads. In further details, the LDC converts the high voltage generated by the main battery (high voltage battery) to a low voltage, and outputs the low voltage to charge the sub-battery (low voltage battery).

Meanwhile, charging of a main battery may be implemented by connecting a charging plug installed at a battery charging station to an EV. In a case an AC power is supplied from outside by connection of the charging plug, an OBC (On-Board Charger) mounted inside the EV converts an AC power to a high DC voltage to charge the main battery.

The OBC is one of electrical equipment receiving a driving power from a sub-battery, such that if the sub-battery is discharged, the OBC may not be normally driven. As a result, if the sub-battery is discharged, the OBC cannot operate, such that even if an AC power is supplied through a charging plug, the main battery cannot be charged, whereby the EV cannot be supplied with a driving power to disadvantageously make the EV inoperable.

Another disadvantage is that the conventional OBC can charge only the main battery using an AC power and cannot charge the sub-battery, such that a user must inconveniently prepare a separate charging equipment to charge the sub-battery.

SUMMARY OF THE DISCLOSURE

This section provides a general summary of the disclosure, and is not a comprehensive disclosure of its full scope or all of its features.

Exemplary aspects of the present disclosure are to substantially solve at least the above problems and/or disadvantages and to provide at least the advantages below. Accordingly, an aspect of the present disclosure provides a power supply system for electric vehicle configured to selectively supply a high DC voltage or a low DC voltage by converting an externally-supplied AC power source, and a control method of a power supply system for electric vehicle.

It should be emphasized, however, that the present disclosure is not limited to a particular disclosure, as explained above. It should be understood that other technical subjects not mentioned herein may be appreciated by those skilled in the art.

In one general aspect of the present disclosure, there is provided a power supply system for electric vehicle (EV), the system including a high voltage battery formed with a plurality of battery cells and generating a power driving source to a motor of the EV, and a low voltage battery generating a power driving source for electrical load, the system comprising an OBC (On-Board-Charger) selectively charging a high voltage battery or a low voltage battery using an externally-supplied AC power source based on an output voltage level of the low voltage battery.

In some exemplary embodiments, the OBC includes a high voltage converter converting the AC power source to a first DC voltage for being supplied as a power charging source of the high voltage battery, a low voltage converter converting the AC power source to a second DC voltage for being supplied as a power charging source of the low voltage battery and as a power driving source of the electrical load, and a controller comparing an output voltage level of the low voltage battery with a predetermined voltage level to selectively drive the high voltage converter or the low voltage converter.

In some exemplary embodiments, the controller drives the low voltage converter, in a case the output voltage level of the low voltage battery is less than the predetermined voltage level.

In some exemplary embodiments, the controller drives the high voltage converter, in a case the output voltage level of the low voltage battery is greater than the predetermined voltage level.

In some exemplary embodiments, the controller includes a switch in which a first terminal is fixedly connected to the low voltage battery, and a second terminal is selectively connected to the low voltage converter or the high voltage converter.

In some exemplary embodiments, the switch is configured such that the second terminal is connected to the low voltage converter, in a case the output voltage level of the low voltage battery is less than the predetermined voltage level, and the second terminal is connected to the high voltage converter, in a case the output voltage level of the low voltage battery is greater than the predetermined voltage level.

In some exemplary embodiments, the OBC is driven, in a case the externally-supplied AC power source is supplied.

In some exemplary embodiments, the power supply system further comprises an LDC (low voltage DC-DC Converter) converting a high voltage generated by the high voltage battery to a low voltage to charge the low voltage battery, and the LDC is driven to charge the low voltage battery, in a case the OBC charges the high voltage battery.

In some exemplary embodiments, the high voltage battery is configured such that a plurality of battery cells is connected in a serial method, or in a parallel method of serially connected battery cells.

In another general aspect of the present disclosure, there is provided a control method of power supply system for electric vehicle, the system including
a high voltage battery formed with a plurality of battery cells to generate a power driving source to a motor of the EV, and a low voltage battery generating a power driving source for electrical load, and an OBC (On-Board-Charger) providing a power charging source to the high voltage battery or the low voltage battery, the method comprising: comparing, by a controller of the OBC, an output voltage of the low voltage battery with a predetermined voltage level; and selectively driving a high voltage converter or a low voltage converter of the OBC as a result of the comparison to provide a power charging source to the high voltage battery or the low voltage battery.

In some exemplary embodiments, the step of providing the power charging source to the low voltage battery or the high voltage battery includes driving, by the controller, the low voltage converter, in a case the output voltage level of the low voltage battery is less than the predetermined voltage level, to provide the output voltage of the low voltage converter as a power charging source of the low voltage battery.

In some exemplary embodiments, the step of providing the power charging source to the low voltage battery or the high voltage battery includes driving, by the controller, the high voltage converter, in a case the output voltage level of the low voltage battery is greater than the predetermined voltage level, to provide the output voltage of the high voltage converter as a power charging source of the high voltage battery.

The power supply system for EV and control method thereof have an advantageous effect in that an externally supplied AC power source is used for a power driving source of an OBC mounted on the EV to stably drive the OBC regardless of a charged state of a low voltage battery, and a high voltage battery and the low voltage battery are selectively charged using the externally supplied AC power source to charge the low voltage battery free from a separate charging equipment.

Other exemplary aspects, advantages, and salient features of the disclosure will become more apparent to persons of ordinary skill in the art from the following detailed description, which, taken in conjunction with the annexed drawings, discloses exemplary embodiments of the invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of the invention are discussed infra.

BRIEF DESCRIPTION OF THE DRAWINGS

The above and other features of the present invention will now be described in detail with reference to certain exemplary embodiments thereof illustrated in the accompanying drawings which are given hereinafter by way of illustration only, and thus are not limitative of the present invention, and wherein.

Figure 1:
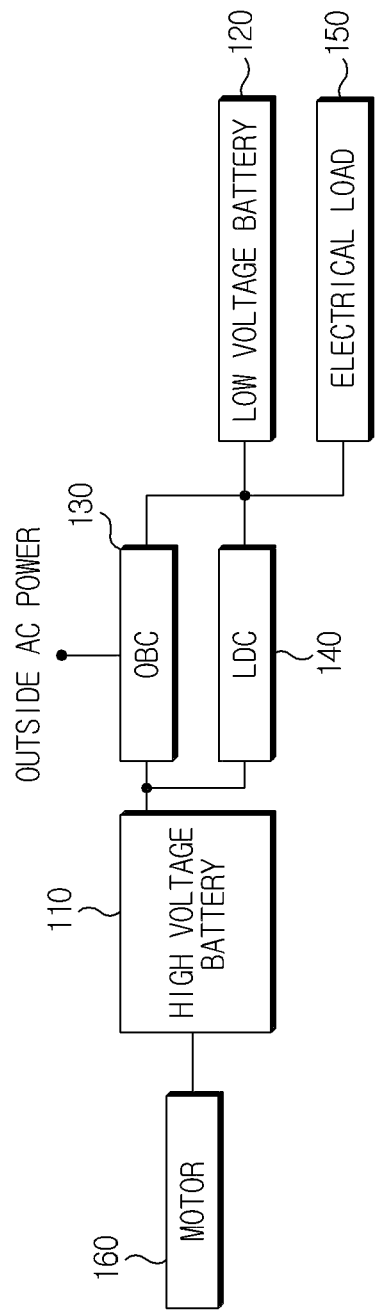
FIG. 1 is a schematic block diagram illustrating a configuration of a power supply system for an electric vehicle according to an exemplary embodiment of the present disclosure.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

DETAILED DESCRIPTION

Hereinafter, exemplary embodiments of the present disclosure will be described in detail with reference to the accompanying drawings.

In describing the present disclosure, detailed descriptions of constructions or processes known in the art may be omitted to avoid obscuring appreciation of the invention by a person of ordinary skill in the art with unnecessary detail regarding such known constructions and functions. Accordingly, the meaning of specific terms or words used in the specification and claims should not be limited to the literal or commonly employed sense, but should be construed or may be different in accordance with the intention of a user or an operator and customary usages. Therefore, the definition of the specific terms or words should be based on the contents across the specification.

The suffixes 'module', 'unit' and 'part' may be used for elements in order to facilitate the disclosure. Significant meanings or roles may not be given to the suffixes themselves and it is understood that the 'module', 'unit' and 'part' may be used together or interchangeably. That is, the terms "-er", "-or", "part" and "module" described in the specification mean units for processing at least one function and operation and can be implemented by hardware components or software components, and combinations thereof.

As used herein, "exemplary" is merely meant to mean an example, rather than the best. It is also to be appreciated that features, layers and/or elements depicted herein are illustrated with particular dimensions and/or orientations relative to one another for purposes of simplicity and ease of understanding, and that the actual dimensions and/or orientations may differ substantially from that illustrated. That is, in the drawings, the size and relative sizes of layers, regions and/or other elements may be exaggerated or reduced for clarity. Like numbers refer to like elements throughout and explanations that duplicate one another will be omitted.

It will be understood that, although the terms first, second, etc. may be used herein to describe various elements, these elements should not be limited by these terms. These terms are only used to distinguish one element from another. For example, a first region/layer could be termed a second region/layer, and, similarly, a second region/layer could be termed a first region/layer without departing from the teachings of the disclosure.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

FIG. 1 is a schematic block diagram illustrating a configuration of a power supply system for an electric vehicle according to an exemplary embodiment of the present disclosure.

Referring to FIG. 1, the power supply system for electric vehicle (EV) according to an exemplary embodiment of the present disclosure includes a high voltage battery (110) supplying a high voltage power driving source, a low voltage battery (120) providing a power driving source to low voltage electrical load of the EV, an OBC (On-Board Charger, 130), an LDC (low voltage DC-DC Converter, 140) charging the low voltage battery, and an electrical load (150).

Constituent parts illustrated in FIG. 1 are the ones for illustrating the present disclosure, and it should be apparent to the skilled in the art that the power supply system for the EV according to the exemplary embodiment of the present disclosure can be formed with more constituent parts than are illustrated in FIG. 1.

The high voltage battery (110) provides a high voltage as a power driving source for driving high voltage electrical loads such as a motor (160) and an inverter of the EV. The high voltage battery (110) may include a plurality of battery cells connected in series or in a parallel method of serially connected battery cells for supplying a high voltage (e.g., 300V) to the motor. Generally, each of the plurality of battery cells outputs a plurality of voltages.

The low voltage battery (120) provides a driving power to various electrical loads of the EV. In view of the fact that the electrical loads are generally operated by a low voltage, e.g., 12V or 24V, the low voltage battery (120) is provided as a sub-battery that is separately mounted from the high voltage battery (110) which is a main battery supplying a driving power to the EV.

The OBC (130) converts an externally-supplied AC power source to a DC voltage to selectively charge the high voltage battery (110) or the low voltage battery (120) in response to an output voltage level of the low voltage battery (120). The OBC can output the converted externally-supplied AC power source as a first DC voltage and a second DC voltage each having a different voltage level and can selectively output the first DC voltage and the second DC voltage in response to an output voltage level of the low voltage battery. The first DC voltage may be a power charging source for charging the high voltage battery with hundreds of volts and the second DC voltage may be a power charging source for charging the low voltage battery with tens of volts.

Meanwhile, the second DC voltage may be provided as a power charging source of the low voltage battery (120) and simultaneously as a driving power source of the LDC (140) and the electrical load (150). The selective supply of power charging source of the OBC (130) will be described in detail with reference to FIG. 2.

Meanwhile, the OBC (130) receiving a driving power source from the externally supplied AC power source may be driven, in a case the EV receives the AC power source for battery charge by stopping or parking at the charging station.

Because the OBC (130) according to the present disclosure can receive a power driving source from the externally supplied AC power source, the OBC (130) according to the present disclosure, unlike the conventional OBC that receives a power driving source from the low voltage battery (120), can be normally driven regardless of discharge of the low voltage battery (120), and in a case the AC power source is applied, the OBC (130) according to the present disclosure can stably charge the high and low voltage batteries (110, 120).

The LDC (140) uses the high voltage generated by the high voltage battery (110) to charge the low voltage battery (120). The charging of the low voltage battery (120) using the LDC (140) is different from that using the OBC (130), where the charging of the low voltage battery (120) using the OBC (130) may be realized when the externally supplied AC power source is applied to the EV, and the charging of the low voltage battery (120) using the LDC (140) may be realized when the EV is running.

The LDC (140) receives a high voltage from the high voltage battery (110) and converts the high voltage to a plurality of low voltages, where the converted low voltages are provided as a power charging source for charging the low voltage battery (120). The LDC generally outputs a plurality of voltages. In a non-limiting example, the LDC may be set up to output a voltage higher by several voltages than 12V when the low voltage battery outputs 12V. The electrical load (150) is defined by various electronic parts mounted on the EV and receives a low voltage (e.g., 12V, 24V) power driving source from the low voltage battery.

Figure 2:
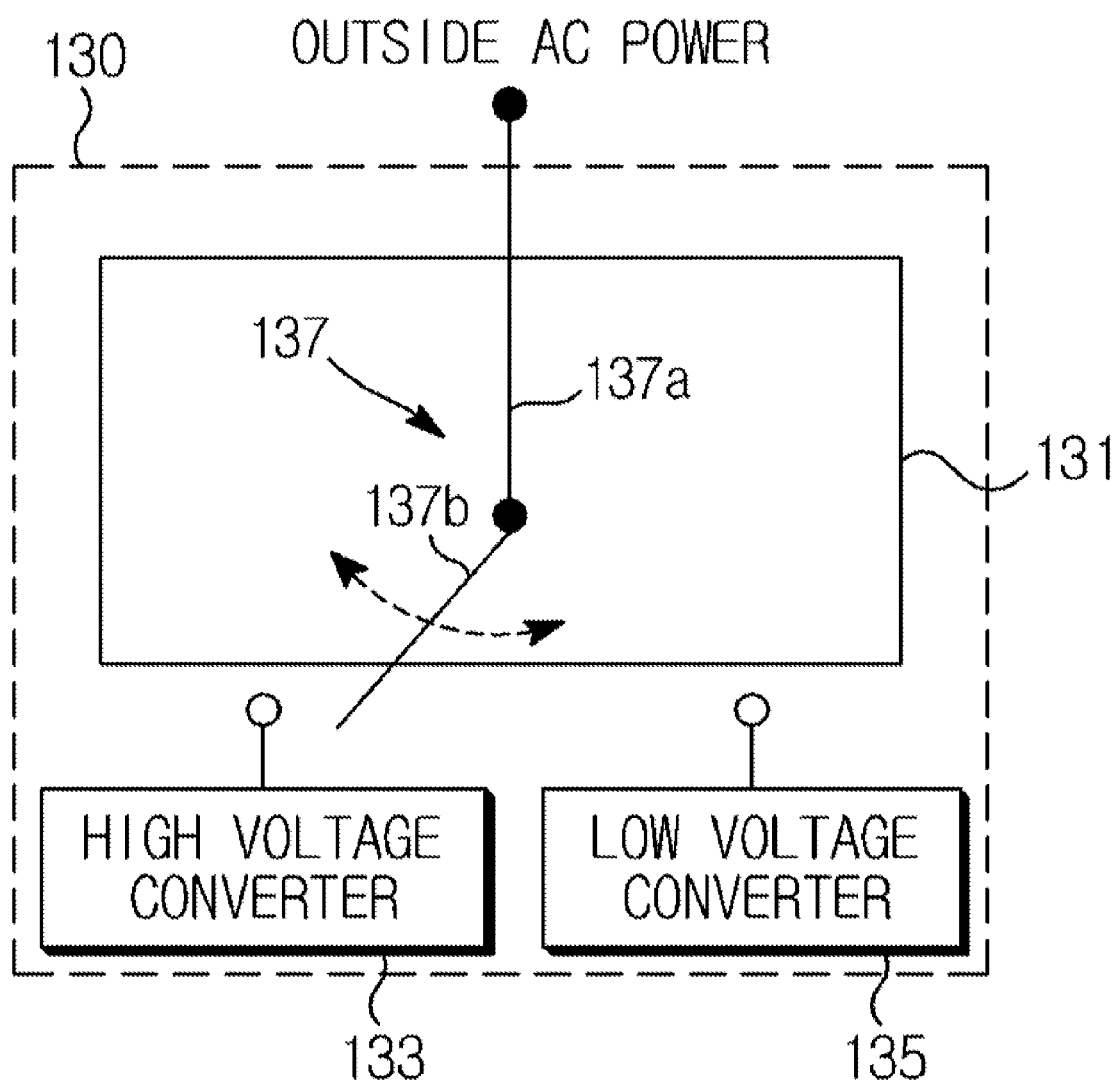
FIG. 2 is a schematic block diagram illustrating an OBC mounted on a power supply system for an electric vehicle according to an exemplary embodiment of the present disclosure.

FIG. 2 is a schematic block diagram illustrating an OBC mounted on a power supply system for an electric vehicle according to an exemplary embodiment of the present disclosure.

Referring to FIG. 2, the OBC (130) includes a controller (131), a high voltage converter (133) and a low voltage converter (135).

The controller (131) compares an output voltage level of the low voltage battery (120) with a predetermined voltage level, in a case an AC power source is supplied from outside, where the predetermined voltage level may be set based on a level of voltage outputted when the low voltage battery (120) is not in a discharging state. In a non-limiting example, in a case a normal output voltage level of the low voltage battery (120) is 12V, the predetermined voltage level may be set at approximately 12V.

The controller (131) may include a switch (137), where a first terminal (137a) of the switch is fixedly connected to an AC power source and a second terminal (137b) of the switch is selectively connected to the low voltage converter (135) or the high voltage converter (133).

If the result of the comparison shows that the output voltage level of the low voltage battery (120) is greater than the predetermined voltage level, the second terminal (137b) of the switch (137) is connected to the high voltage converter (133) to drive the high voltage converter (133) and to provide a power charging source for the high voltage battery (110). The output voltage level of the low voltage battery is greater than the predetermined voltage level when the low voltage battery is not discharged, such that the OBC (130) does not charge the low voltage battery but charges the high voltage battery.

If the result of the comparison shows that the output voltage level of the low voltage battery (120) is less than the predetermined voltage level, the second terminal (137b) of the switch (137) is connected to the low voltage converter (135) to drive the low voltage converter and to provide a power charging source for the low voltage battery. The output voltage level of the low voltage battery is less than the predetermined voltage level when the low voltage battery is discharged, such that the OBC (130) charges the low voltage battery.

The controller (131) continuously or periodically determines the output voltage level of the low voltage battery (120), and stops the driving of the low voltage converter (135), and drives the high voltage converter (133) to start to charge the high voltage battery (110) if the output voltage level of the low voltage battery (120) becomes greater than the predetermined voltage level.

The high voltage converter (133) converts the externally-supplied AC power source to a first DC voltage of several hundred voltages and provides as a power charging source of the high voltage battery (110). The high voltage converter (133) may include a rectifier to convert the AC power source to a DC voltage, and may include a DC-DC converter to vary the voltage level of the DC voltage converted by the rectifier.

The low voltage converter (135) converts the externally-supplied AC power source to a second DC voltage of several dozens of voltages and provides as a power charging source of the low voltage battery (120) and the electric load (150). The low voltage converter (135) may include a rectifier to convert the AC power source to a DC voltage, and may include a DC-DC converter to set a voltage level of the DC voltage, like the high voltage converter (133).

The OBC (130) thus configured starts to drive, in a case an AC power source is applied from outside, and to perform a stable driving regardless of a charged state of the low voltage battery (120). Furthermore, the OBC (130) can charge the low voltage battery (120) and the high voltage battery (110) as well, using the externally-supplied AC power source, such that the low voltage battery (120) can be charged free from a separate charging device.

Figure 3:
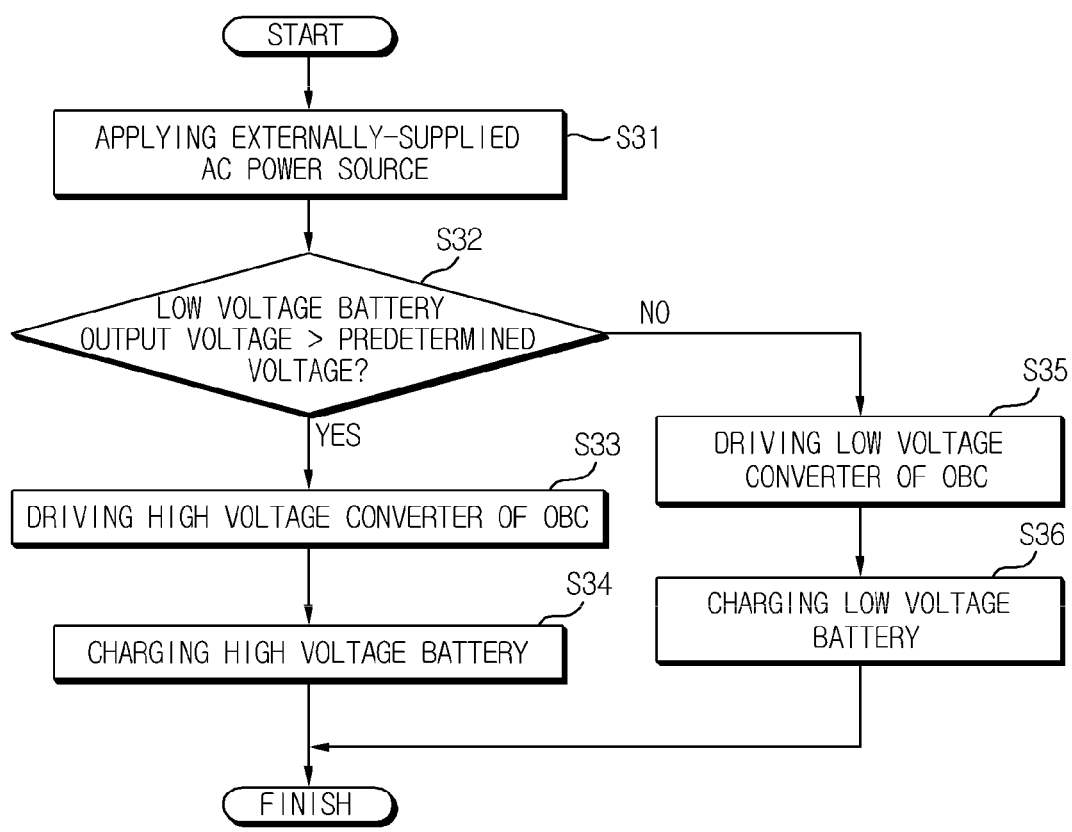
FIG. 3 is a flowchart illustrating a control method of a power supply system for an electric vehicle according to another exemplary embodiment of the present disclosure.

FIG. 3 is a flowchart illustrating a control method of a power supply system for an electric vehicle according to another exemplary embodiment of the present disclosure.

In a case an AC power source is supplied to the EV from outside to charge the batteries of the EV (S31), an OBC on the EV starts to be driven.

A controller of the OBC first determines an output voltage level of a low voltage battery to drive any one of a high voltage converter or a low voltage converter in response to an output voltage level of the low voltage battery. The controller compares the output voltage of the low voltage battery with a predetermined voltage level (S32).

As a result of the determination at S32, if the output voltage of the low voltage battery is greater than the predetermined voltage level, the controller drives the high voltage converter to convert the AC power source to a first DC voltage of several hundreds of voltages, and provides the first DC voltage to the high voltage battery as a power charging source (S33, S34).

As a result of the determination at S32, if the output voltage of the low voltage battery is lower than the predetermined voltage level, the controller drives the low voltage converter to convert the AC power source to a second DC voltage of several dozens of voltages, and provides the second DC voltage to the low voltage battery as a power charging source (S35, S36).

The above-mentioned power supply system and control method thereof according to the present disclosure may, however, be embodied in many different forms and should not be construed as limited to the embodiments set forth herein. Thus, it is intended that embodiments of the present disclosure may cover the modifications and variations of this disclosure provided they come within the scope of the appended claims and their equivalents.

While particular features or aspects may have been disclosed with respect to several embodiments, such features or aspects may be selectively combined with one or more other features and/or aspects of other embodiments as may be desired.

What is claimed is:

1. A power supply system for an electric vehicle (EV), the system comprising:
   a high voltage battery formed with a plurality of battery cells to generate a power driving source for a motor of the EV;
   a low voltage battery generating a power driving source for an electrical load; and
   an OBC (On-Board-Charger) selectively charging the high voltage battery or the low voltage battery using an externally-supplied AC power source based on an output voltage level of the low voltage battery,
   wherein the OBC comprises:
      a high voltage converter converting the AC power source to a first DC voltage for use as a power charging source for the high voltage battery;
      a low voltage converter converting the AC power source to a second DC voltage for use as a power charging source of the low voltage battery and as a power driving source for the electrical load; and
      a controller comparing an output voltage level of the low voltage battery with a predetermined voltage level to selectively drive the high voltage converter or the low voltage converter,
   wherein the controller comprises a switch having a first terminal fixedly connected to the low voltage battery and a second terminal selectively connected to the low voltage converter or the high voltage converter, and
   wherein the second terminal is connected to the low voltage converter if the output voltage level of the low voltage battery is less than the predetermined voltage level and the second terminal is connected to the high voltage converter if the output voltage level of the low voltage battery is greater than the predetermined voltage level.

2. The system of claim 1, wherein the controller further drives the low voltage converter if the output voltage level of the low voltage battery is less than the predetermined voltage level.

3. The system of claim 1, wherein the controller further drives the high voltage converter if the output voltage level of the low voltage battery is greater than the predetermined voltage level.

4. The system of claim 1, wherein the OBC is driven when the AC power source is supplied.

5. The system of claim 1, further comprising an LDC (low voltage DC-DC Converter) converting a high voltage generated by the high voltage battery to a low voltage in order to charge the low voltage battery, the LDC driven when the OBC charges the high voltage battery.

6. The system of claim 1, wherein the high voltage battery comprises a plurality of battery cells connected in a serial method or a parallel method of serially connected battery cells.

7. A control method of a power supply system for an electric vehicle (EV), the system including a high voltage battery formed with a plurality of battery cells to generate a power driving source for a motor of the EV, a low voltage battery to generate power driving source for an electrical load, and an OBC (On-Board-Charger) to provide a power charging source for the high voltage battery or the low voltage battery, the method comprising:

comparing an output voltage of the low voltage battery with a predetermined voltage level; and driving a high voltage converter or a low voltage converter of the OBC via a switch, the switch having a first terminal fixedly connected to an AC power source and a second terminal selectively connected to the low voltage converter or the high voltage converter, wherein selectively connecting the second terminal of the switch comprises:

connecting the second terminal to the high voltage converter to provide an output voltage of the high voltage converter as a charging source for the high voltage battery when the output voltage of the low voltage battery is greater than the predetermined voltage level; and connecting the second terminal to the low voltage converter to provide an output voltage of the low voltage converter as a charging source for the low voltage battery when the output voltage of the low voltage battery is less than the predetermined voltage level.

* * * * *